May 31, 1960 M. T. THORSSON ET AL 2,938,701
BATCH WEIGHING AUTOMATIC WEIGHING SYSTEMS
Filed April 21, 1954 4 Sheets-Sheet 4

INVENTORS
MATTHEW T. THORSSON
LOUIS J. LAULER
BY Paul L. Keohu
ATTY.

United States Patent Office 2,938,701
Patented May 31, 1960

2,938,701
BATCH WEIGHING AUTOMATIC WEIGHING SYSTEMS

Matthew T. Thorsson, Moline, and Louis J. Lauler, Rock Island, Ill., assignors to Fairbanks, Morse & Co., Chicago, Ill., a corporation of Illinois Filed Apr. 21, 1954, Ser. No. 424,596

13 Claims. (Cl. 249—14)

This invention relates to batch weighing and automatic weighing systems, and has particular reference to novel weighing systems for automatically measuring predetermined quantities of materials or ingredients into a hopper.

The automatic weighing systems of the present invention include a container or hopper, for receiving flowable materials, supported by means of a load cell of known construction, so that the load cell is stressed by the material received in the hopper. The load cell provides an electrical network which, as the load cell is stressed, produces an output voltage the magnitude of which is dependent upon the amount of load supported by the load cell. Also included in the weighing systems is a balancing circuit capable of providing an adjustable voltage in opposition to the load cell voltage. The load cell normally will be subjected to an initial strain due to the weight of the hopper and other associated parts carried by the load cell, and the voltage produced by the load cell due to this initial strain will be called the tare or dead weight voltage. The opposing voltage produced by the balancing circuit is adjusted to a value equal to the tare or dead weight voltage of the load cell, so that the combined output voltage from the load cell and balancing circuit will be zero when no material is present in the hopper.

Once the balancing circuit has been so adjusted, placing material in the hopper will further stress the load cell network and produce a net cell output voltage which serves in part as the input signal of an electronic amplifier. In series with the load cell network, balancing circuit and electronic amplifier input, is a cut-off circuit. This circuit provides an adjustable voltage which is in phase opposition to the net load cell voltage. Thus the effective voltage, hereinafter called the error signal, that is present at the input of the electronic amplifier is the difference in voltage between the net load cell voltage and the opposing cut-off circuit voltage. The amplified error signal is delivered to a phase detector relay circuit, which in combination with a control circuit for the entire weighing system, governs operation of an electro-magnetically controlled valve controlling material flow to the hopper.

In operation of the automatic weighing system as thus far indicated, the cut-off circuit is initially adjusted to produce an opposing voltage equal to the net load cell voltage that will be produced by the load cell network when a desired, predetermined quantity of material has been received in the hopper. The flow of material to the hopper is initiated by the control circuit, and as will hereinafter appear in greater detail the weighing system cannot be rendered operative until the amplifier is sufficiently "warmed up" and unless the discharge valve of the hopper is closed. Since the error signal is the difference between the load cell voltage and cut-off circuit opposing voltage, initially the error signal will be equal to the cut-off circuit voltage because the net load cell votage will be zero. As material flows into the hopper, thereby increasing the net load cell voltage, the error signal diminishes until it reaches zero value, when the cut-off circuit voltage and the load cell voltage are equal. The phase detector relay circuit, upon detecting the absence of an error signal, operates to close the material flow control valve and cut-off the feed of the mateiral into the hopper, so that only the preselected amount of material, as determined by the adjustment of the cut-off circuit, is delivered to the hopper.

In certain applications of automatic weighing systems it is highly desirable to provide a "dribble" approach to the final cut-off of material flow. This means that the material flows into the hopper at a high rate through a main valve until it has fed a quantity of material slightly less than the final specified amount, and then the material feeds at a reduced rate through a dribble valve until the final cut-off value is reached. The dribble approach to cut-off is accomplished by providing a second material flow control valve, called a dribble valve, and providing a dribble potentiometer in series with the amplifier input, load cell network, balancing circuit and cut-off circuit. Assuming by way of example that material to the extent of 200 lbs. is to be fed to the hopper, the dribble potentiometer may be adjusted to produce a dribble voltage equal to the load cell voltage when say 20 lbs. of material are carried by the cell. The dribble voltage is in phase opposition to the cut-off voltage to provide an effective cut-off circuit voltage proportional to or representative of 180 pounds. When 180 pounds of material are fed into the hopper, the load cell voltage, dribble voltage and cut-off voltage provide zero error signal at the amplifier, and the phase detector relay then causes the main material supply valve to close. At the same time a shorting circuit is rendered operative to nullify the effect of the dribble voltage, and cause an error signal repersentative of 20 pounds. The dribble control valve then remains open until 20 pounds of material flows through this valve into the hopper at a slow rate. Whereupon and when the load cell voltage and the cut-off circuit voltage balance to indicate that the load in the hopper is 200 pounds, the dribble valve will be closed by the phase detector relay circuit and control circuits.

In the systems as hereinabove described, it has been assumed that only one ingredient was to be weighed, but in batching operations several ingredients are fed into the hopper and weighed together. In the automatic batcher of this invention a flow control valve means and a cut-off circuit are provided for each ingredient, and a sequential control circuit is utilized to initiate, control and stop the flow of the ingredients one by one. The amount of each ingredient is selected by appropriately adjusting the potentiometer in the cut-off circuit for that ingredient. Operation of the batch weigher is initiated by the control circuit, and the flow control valve of the first ingredient will be opened to permit flow of the first ingredient into the hopper. The opposing voltage of the cut-off circuit for the first ingredient will continue to provide an error signal for the electronic amplifier until such time as the net load cell voltage, caused by the weight of the first ingredient in the hopper, equals the opposing voltage of the cut-off circuit for the first ingredient. At this time zero error signal occurs so the phase detector relay circuit and control circuits will close the flow control valve of the first ingredient, open the control valve for the second ingredient and place the cut-off circuit for the second ingredient in series with the load cell network, the dead load balancing circuit and the cut-off circuit for the first ingredient. Thus, an error signal equal to the opposing voltage of the cut-off circuit for the second ingredient will then exist, whereupon the control circuits condition the system for flow of ingredient number two into the hopper. The addition of ingredient number two to the batch gradually decreases the error signal until it reaches a zero value, at which time the appropriate quantity of ingredients number one and number two are present in the hopper. When the phase sensitive relay circuit senses the absence of an error voltage, the flow control valve for the second ingredient is closed and the circuit prepares for the third ingredient. Any practical number of ingredients may be combined into a batch in this manner.

Dribble feed is achieved in the batch weigher by providing a dribble valve for each ingredient and a single dribble potentiometer in series with the load cell network, tare weight balancing circuit, amplifier input and the ingredient cut-off circuits. As previously described, the voltage produced by the dribble potentiometer is in phase opposition to the voltages produced in the cut-off circuits. For example, assume that the last 10 pounds of each ingredient fed into the hopper is to be delivered at the dribble rate. Thus when the first ingredient is being fed to the hopper, i.e., only the cut-off circuit of the first ingredient is effective, the first material will feed rapidly until a weight of 10 pounds less than the total weight of the ingredient is present in the hopper. At this time the error signal will be zero because the voltages produced by the load cell, balancing circuit, dribble potentiometer, and the first ingredient cut-off circuit, all of which are in series circuit relationship, will balance out. The control circuits detect the absence of an error signal or voltage and close the main control valve for the first ingredient, while at the same time opening the dribble valve and effectively removing the dribble potentiometer from the aforementioned series circuit to thereby produce an error voltage equal to the difference between the net load cell voltage and the opposing voltage of the number one ingredient cut-off circuit (10 pounds in the example used). As the first ingredient dribbles into the hopper, the error signal or voltage will gradually diminish to zero, at which time the control circuits close the dribble valve for the first ingredient, open the supply valve of the second ingredient, and connect the cut-off circuit for the second ingredient into the series voltage balancing circuit. The shorting circuit for the dribble potentiometer then will be rendered ineffective so that the voltage of the dribble potentiometer is again added to the net load cell voltage. When all but the last 10 pounds of the second ingredient is received in the hopper, a zero error voltage condition will occur and the relay detector circuit will close the main control valve for the second ingredient, open the dribble valve for the second ingredient and once again short out the dribble potentiometer. After the last 10 pounds of the second ingredient has dribbled into the hopper the batch weigher automatically closes the dribble valve for the second ingredient, and then adds the prescribed amounts of the remaining ingredients in a like manner.

In multiple-ingredient batching as above indicated, it is desirable to afford a batching system which may handle any one ingredient alone, up to the total load capacity of the system. However, it is necessary in connection with such systems, to provide an over-load safety control arrangement for protecting the system against damage consequent to inadvertent or even intentional adjustment of the potentiometers in the cut-off circuits, to load values of the ingredients which will result in a total batch weight exceeding the capacity of the system and its load cell means. In the automatic weighing systems of the present invention, such an overload protection circuit is provided having a bridge circuit with one leg thereof made up of a plurality of series arranged rheostats. This bridge circuit provides a control voltage for rendering operative or inoperative a relay circuit, and one rheostat of the series is mechanically connected to the movable contact of the potentiometer in each of the ingredient cut-off circuits. If the potentiometers of the cut-off circuits are positioned in any combinations of positions of adjustment such that the total weight of the ingredients fed into the hopper would be less than the capacity of the load cell, the rheostats of the bridge circuit produce a control signal that will hold the safety relay inactive, so that the batch weigher is operable to produce this predetermined batch. On the other hand, if the potentiometers of the cut-off circuits are positioned such that the total batch weight will exceed the load cell capacity, the bridge circuit will produce a control signal such that the safety relay means will operate to render the automatic batcher completely inoperative. In other words, no ingredients will be fed into the hopper until the "batch formula," as represented by the settings of the cut-off circuit potentiometers, is proportionally reduced so that the load cell capacity will not be exceeded by the total weight of the batch.

Accordingly an object of this invention is to provide a weighing system for measuring by weight, the amount of material delivered to a hopper, the system including an electrical network producing voltage representative of the amount of material in the hopper, a cut-off circuit producing voltage in opposition to the electrical network voltage, and electrical circuit means for sensing the difference between the network and circuit voltages.

Another object of this invention is to provide a system for weighing material, which system includes a voltage balancing circuit for indicating when a predetermined amount of material has been delivered to a hopper, and a control circuit for sensing the condition of the voltage balancing circuit to automatically stop the delivery of material when the predetermined amount of material is in the hopper, the control circuit including a voltage sensing relay circuit.

Another object is to make provision for rendering the complete weighing system inoperative until such time as the electronic parts of the system are sufficiently warmed up, and also so long as and whenever the hopper discharge valve is open.

A further object of this invention is to provide a novel weighing system wherein; a hopper is supported by load cell means so that the weight of the hopper and the weight of material in the hopper stresses the load cell to produce a gross load cell voltage; a balancing circuit provides an adjustable voltage in opposition to the load cell voltage whereby the tare or dead weight of the hopper may be compensated for, so that a net voltage remains; and a cut-off circuit provides an adjustable potential opposed to the net load cell voltage, the difference between the net load cell voltage and the bucking voltage of the cut-off circuit serving as an input signal to an amplifier which constitutes a part of the control circuits of the weighing system. After the cut-off circuit voltage is adjusted to a predetermined value representative of a particular quantity of ingredient to be fed into the hopper, and after operation of the weighing system is initiated, the material will feed into the hopper until the input signal to the amplifier reaches zero value, at which time the control circuits will automatically stop the flow of material.

Another object of this invention is the provision of a weighing system meeting the objectives heretofore stated, and further providing a dribble approach to material flow cut-off.

Another object of this invention is to provide an electrical scale system including a load cell network, an adjustable dribble circuit, a cut-off circuit and electrical control circuits, wherein the voltages developed by the dribble circuit and the load cell are in opposition to the cut-off circuit voltage as material is added to the system until balance of voltages occur, and subsequently the control circuits automatically render the dribble circuit ineffective so that an unbalance voltage condition prevails and material is fed to the scale system at a reduced or dribble rate until a preselected amount of material has been delivered to the scale.

Another object of this invention is to provide a batch weighing system, incorporating the aforementioned objects and features, adapted to weigh the several ingredients of a batch of material.

A further object of the invention is to provide a batch weighing system having a load cell network stressed by ingredients delivered into a hopper, a cut-off circuit for each ingredient, valve means for controlling the flow of each ingredient into the hopper, and control circuits for sequentially rendering the cut-off circuit and control valve means for each ingredient effective to start, control and cut-off the flow of the ingredients in sequence to the hopper.

A still further object is to provide a batch weighing system wherein sequential control and delivery of the various ingredients are automatically effected by control circuits including stepping switches.

Another object of this invention resides in the provision of batch weighing systems wherein a dribble approach to the final weight value of each ingredient is obtained by utilizing a single dribble potentiometer.

A still further object of this invention is to provide an overload protection circuit for batch weighing systems which automatically protects the weighing system when the total weight of all the ingredients of a particular batch formula exceeds the capacity of the weighing system.

These and other objects and advantages will become more readily apparent as the following description proceeds and is read in conjunction with the accompanying drawings in which.

Figure 2:
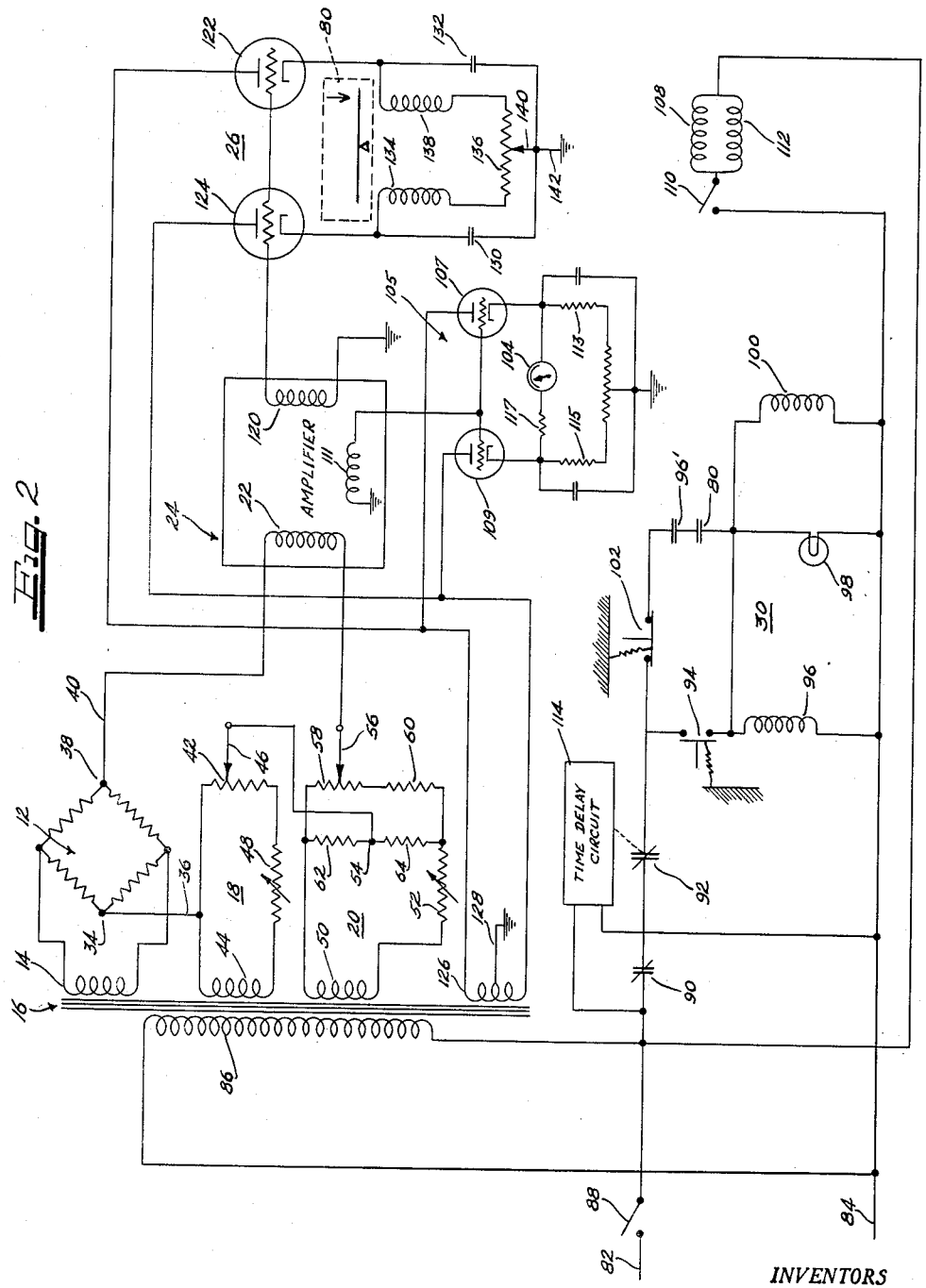
Fig. 2 is a schematic diagram of an electrical circuit arrangement for the electrical apparatus of Fig. 1.
Figure 3:
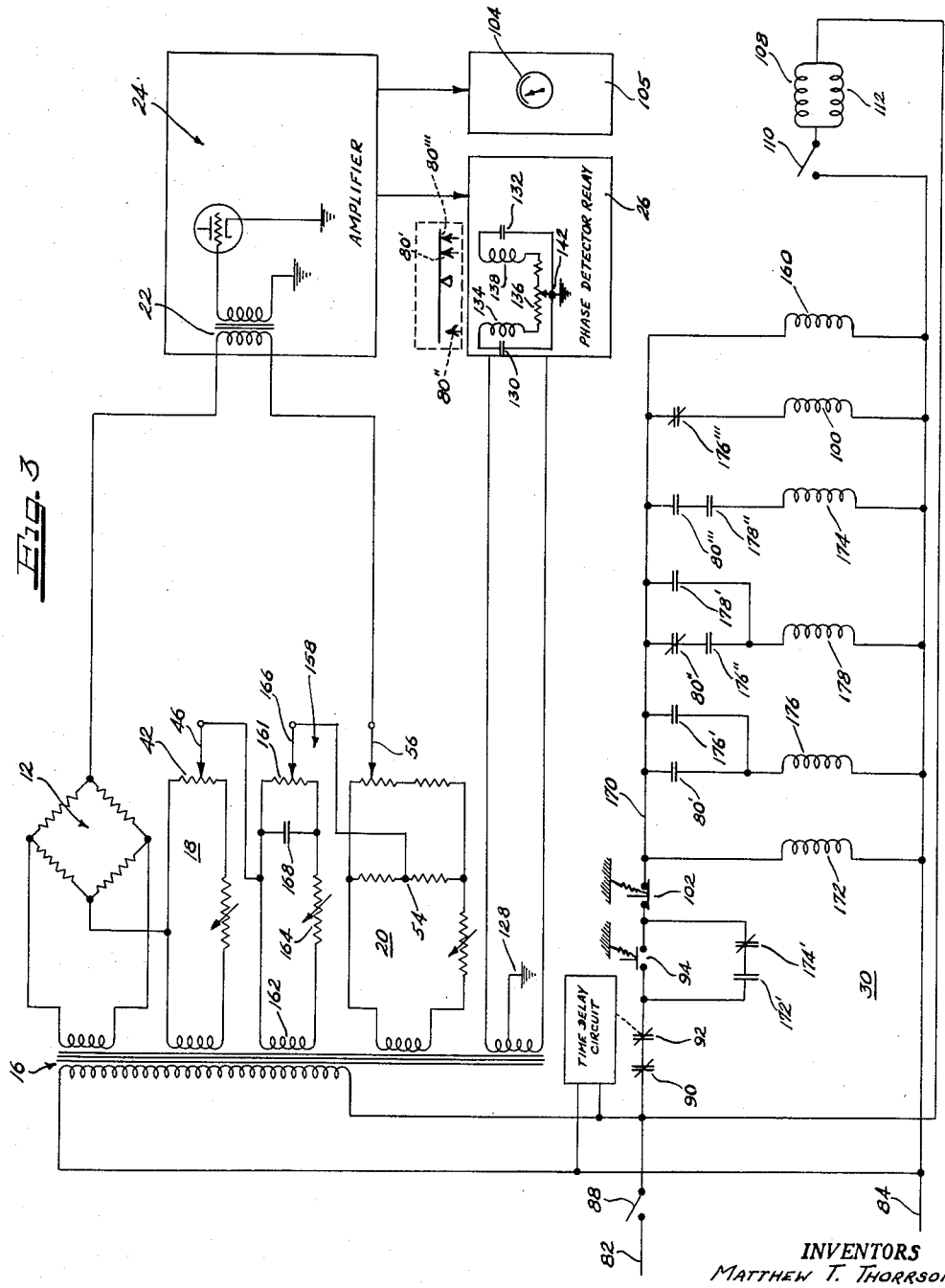
Figure 4:
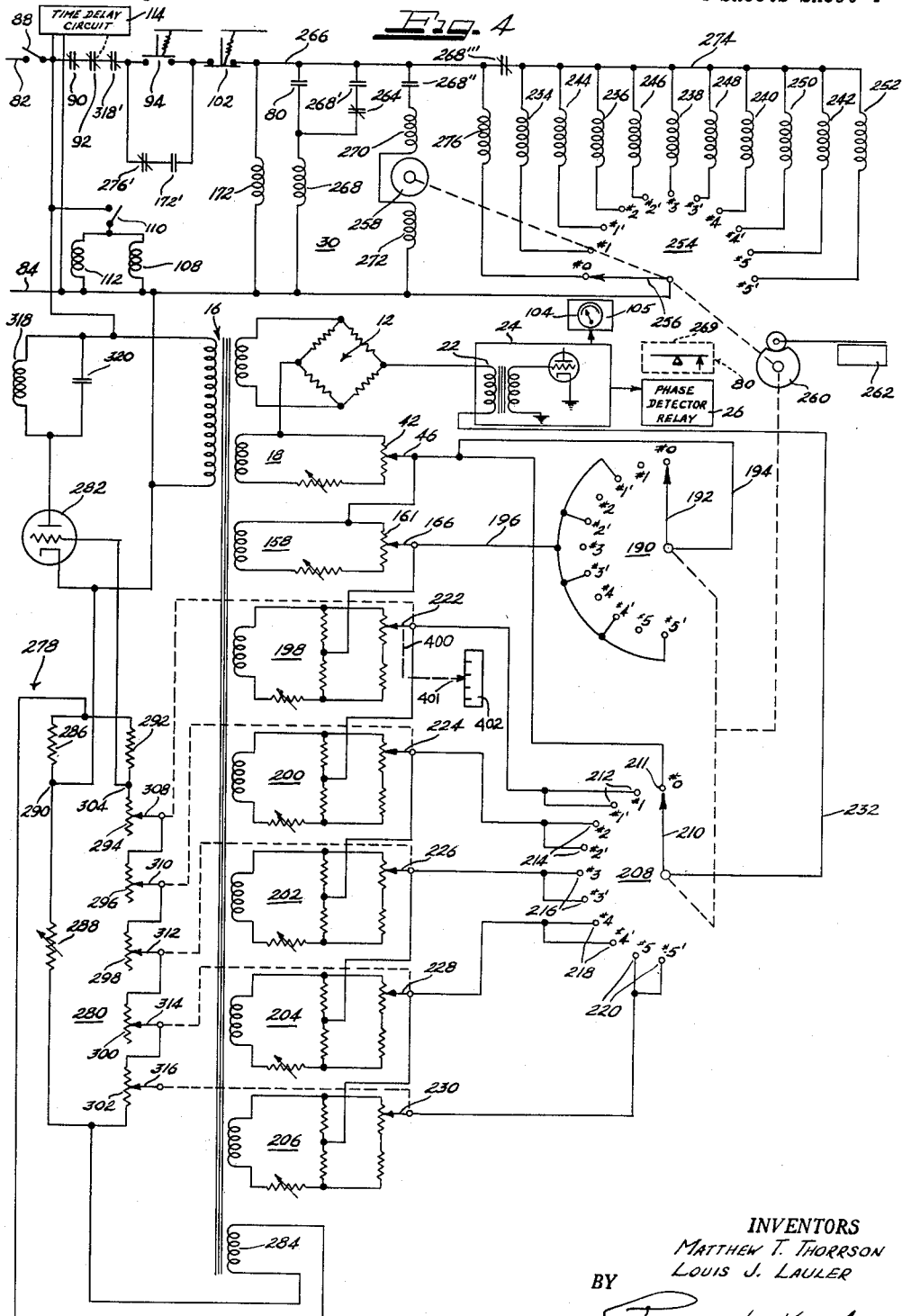

Fig. 3 is a schematic diagram of an electrical circuit arrangement similar to Fig. 2 but further including equipment for permitting a dribble approach to cut-off of material flow; and Fig. 4 is a schematic diagram of a batch weighing system for automatically controlling and cutting-off the flow of five different ingredients, which may be present in a final batch in proportion to preselected adjustments of the various cut-off circuits.

Figure 1:
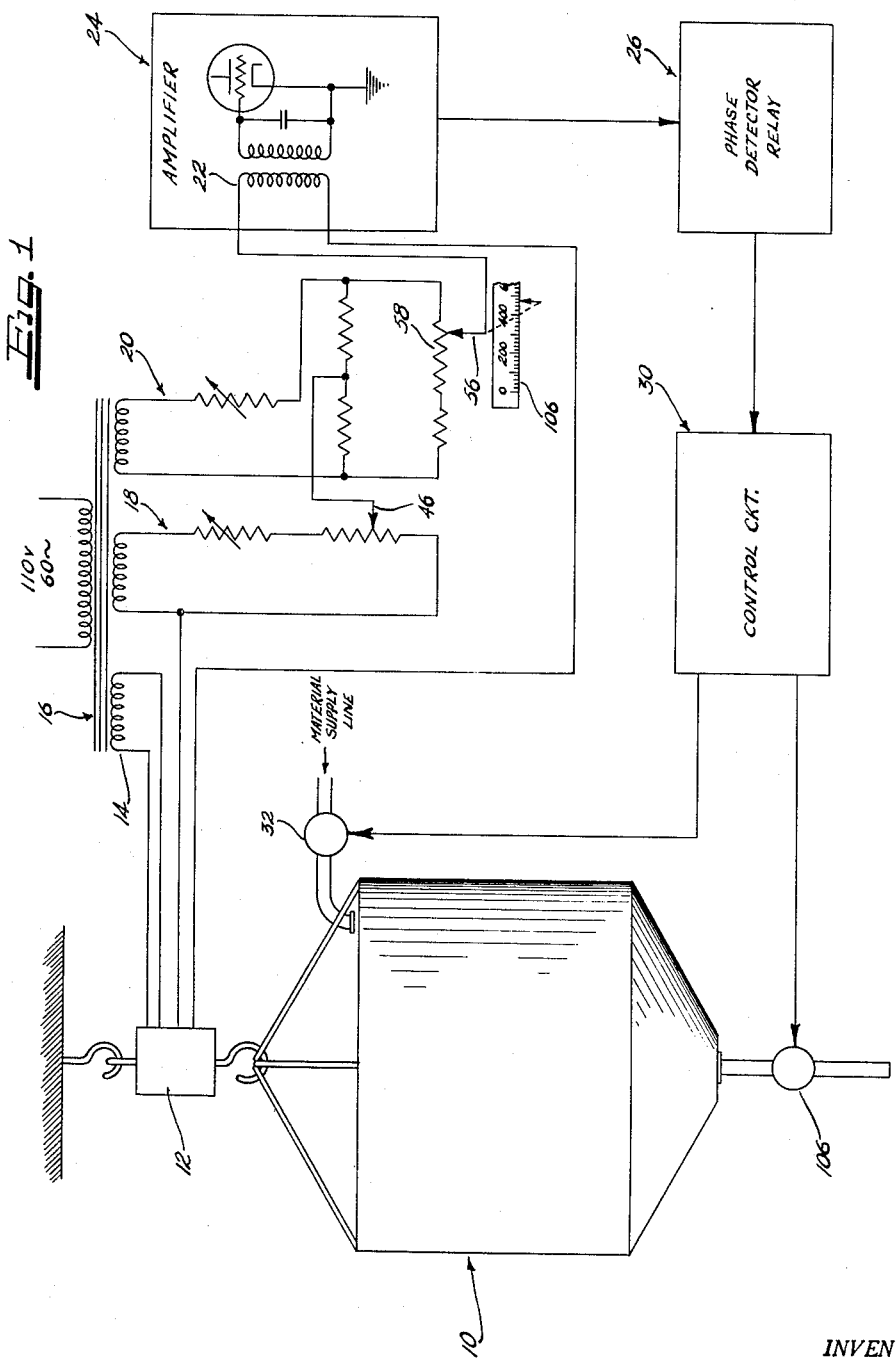
Fig. 1 illustrates diagrammatically a hopper scale mechanism with electrical apparatus in operative association therewith for sensing hopper loading and controlling the delivery of material to the hopper.

Referring to the drawings and first to Fig. 1 thereof, the electrical apparatus for controlling and cutting off the flow of material is operatively associated with a hopper, generally indicated at 10. The hopper, which is a container for receiving the material to be weighed, is supported entirely by a load cell device 12, used in place of the usual scale lever system. The load cell 12 embodies an electrical network having power supplied by a secondary winding 14 of a transformer 16 and having an output circuit providing an output voltage, the magnitude of which is dependent upon the load carried by the cell. Thus any material in hopper 10 is carried by the load cell, which produces an output voltage proportional to, and therefore representative of, the weight of the material in the hopper. The cell output circuit is connected in series with a balancing circuit indicated at 18, a cut-off circuit 20 and input transformer 22 of an amplifier 24. As hereinafter described, balancing circuit 18 is adjusted to provide a voltage in opposition to that part of the load cell voltage due to the weight of the hopper 10 and other tare weights so that only the net load cell voltage, i.e., that voltage representative of material in the hopper, is effective beyond the balancing circuit. Cut-off bridge or circuit 20 produces an adjustable voltage in opposition to the net load cell voltage, and the selected magnitude of this opposing voltage controls the amount of material that will be fed to the hopper. Thus with no material in the hopper and with balancing circuit 18 adjusted to balance out the load cell voltage due to any tare or dead weights, an input or error voltage equal to the opposing voltage provided by bridge 20 will be present at amplifier input 22. This error voltage is amplified and, through phase detector relay 26 and control circuit 30, maintains material flow control valve 32 in an open condition after operation of the weighing system has been initiated. As material enters the hopper, the net load cell voltage will gradually increase, thereby reducing the error voltage, since the cut-off circuit and load cell network voltages are in opposition. When the error signal reaches zero value to indicate that the material in the hopper has reached the preselected weight value, as determined by the initial adjustment of the cut-off bridge, the absence of an error signal will cause valve 32 to be closed to stop material flow.

Referring to Fig. 2, the electrical network of the strain gauge load cell 12 is shown in the form of a Wheatstone bridge supplied with current by secondary winding 14. One output terminal 34 of the load cell network is connected by lead 36 to the balancing circuit 18, while the opposite output terminal 38 is connected by lead 40 directly to the input transformer 22 of amplifier 24. In the balancing circuit, current flow is provided through a potentiometer 42 by means of a secondary winding 44, the current flow being in such a direction as to produce a potential in opposition to the net load cell voltage. Thus as movable contact 46 is moved downwardly in Fig. 2, the voltage drop across that part of the potentiometer between movable contact 46 and lead 36 will be increased. Adjustable resistor 48 is provided to control the total amount of current traversing the balancing circuit. As is known with load cells of the type under consideration, the cell output voltage is substantially zero under conditions of no strain on the load cell. Since as indicated in the description of Fig. 1, the load cell is under an initial strain due to the dead weight of the hopper and other parts carried by or forming a part of the hopper, the balancing circuit 18 through adjusted positionment of movable contact 46 serves to render the initial dead weight voltage ineffective. Thus with no material in the hopper, contact 46 is adjusted to a position where zero voltage appears between lead 40 and movable contact 46.

Cut-off circuit 20 is shown in the form of a bridge energized from winding 50 of transformer 16 through a variable resistor 52. Movable contact 46 is connected to one terminal 54 of circuit 20, while the other or output terminal is represented by a movable contact 56 of potentiometer 58. Potentiometer 58 is connected in series with resistor 60 and together they represent one-half of the bridge circuit, while series connected resistors 62 and 64 with terminal 54 intermediate thereof serve as the other half of the bridge circuit. When movable contact 56 is moved to a position wherein the resistance between the movable contact and the upper end of potentiometer 58 is equal to the resistance of resistor 62 (and by design, at this positionment of movable contact 56 the resistance between the movable contact and the lower end of resistor 60 will be equal to the resistance of resistor 64) zero potential will appear between terminal 54 and contact 56. Current flow through bridge circuit 20 from winding 50 is in such a direction that movement of contact 56 upwardly as viewed in Fig. 2, will cause a potential to appear between terminals 54 and 56, the potential magnitude of which increases by further movement of the contact, while the phase direction of the potential is in opposition to the load cell voltage produced by cell network 12 when material is added to the hopper. Since bridge 20, balance circuit 18 and load cell network 12 are in series, the error signal input to amplifier 24 will equal the algebraic sum of the net load cell voltage and opposing voltage of the cut off circuit, assuming the dead load voltage of the load cell has been balanced out by appropriately positioning movable contact 46 of potentiometer 42.

The error signal is amplified by amplifier 24, which may be of conventional design and the particulars of which form no part of the present invention, and then passed to phase detector relay circuit 26. The primary function of circuit 26 is to control the operation of relay contacts 80 in the control circuit 30 now to be described. In the control circuit 110 volt, 60 cycle leads 82 and 84 supply current to primary winding 86 of transformer 16. A main power switch 88 is provided in line 82, as are relay contacts 90 and 92, hereinafter described. Push button start switch 94 is connected in series with a relay coil 96 between lines 82 and 84, and coil 96 is connected in parallel with an indicating light 98 and a solenoid winding 100 of the material control valve 32 (Fig. 1). A push button stop switch 102 is connected in series with contacts 96' of relay coil 96, contacts 80 of phase detector relay circuit 26 and the parallel combination of coil 96, light 98 and solenoid 100 between leads 82 and 84. Start button 94 is a normally open switch while stop button 102 is normally closed.

The weighing system shown in Figs. 1 and 2 is adapted for causing feed of a preselected amount or weight of material into the hopper and for automatically cutting off material flow into the hopper when the preselected weight has been reached. In operation the main switch 88 is closed to supply power to transformer 16 and thus energize load cell 12, cut-off circuit 20, balancing circuit 18, amplifier 24 and relay circuit 26. Assuming that the system has not been adjusted to compensate for the dead weight of the hopper carried by the load cell, the movable contact 46 is moved until zero voltage appears at the input of amplifier 24. This tare or dead weight balance is accomplished with the cut-off bridge 20 adjusted to a position providing zero opposing voltage, and is indicated by a meter 104 of a balance measuring circuit 105 adapted to sense the presence or absence of an error signal in the manner hereinafter described. Thus movable contact 46 is adjusted until meter 104 reads zero. The amount of material to be delivered to the hopper is determined by the magnitude of the opposing voltage produced by cut-off circuit 20. It should be understood that the voltage drop across potentiometer 58 is adjusted by means of resistor 52 until a predetermined movement of contact 56 produces an opposing voltage equal to the net load cell voltage produced by adding a prescribed number of pounds in the hopper. Thus a graduated chart, as schematically shown at 106 in Fig. 1, may be associated with movable contact 56 to provide a visual indication of the weight of the material which will be fed into the hopper for any particular positionment of contact 56. Assuming by way of example that 400 pounds of a liquid is to be delivered into hopper 10, movable contact 56 is displaced to a position where cut-off bridge 20 produces an opposing voltage equal to the net load cell voltage when the hopper contains 400 pounds. Under these conditions the only input voltage to amplifier 24 is that of the cut-off circuit, and the amplified error signal passes to phase detector relay 26 to close contacts 80 in control circuit 30. To initiate the flow of material into hopper 10, start switch 94 is momentarily closed to energize relay coil 96 causing contacts 96' to close. Since contacts 80 are closed and stop button 102 is normally closed, coil 96, light 98, and valve 100 will be energized upon closing start button 94, and will remain energized via contacts 96' and 80 even after the start button is released. Energization of solenoid 100 opens flow control valve 32 (Fig. 1) and liquid begins to flow into hopper 10. As liquid continuously enters the hopper, the load cell is stressed by the additional weight to produce an increasing net load cell voltage. So long as this net cell voltage is less than the opposing voltage of the cut-off circuit 20, the amplified error voltage will, by means of phase detector relay 26, retain contacts 80 in closed condition. When 400 pounds of liquid are delivered to hopper 10, the net load cell voltage and cut-off bridge voltage will be equal and opposite, hence no error voltage will be impressed on amplifier 24. Phase detector relay 26 in detecting the absence of an error signal, effects opening of contacts 80. Opening of contacts 80 de-energizes solenoid 100 to close valve 32 (Fig. 1), de-energizes light 98 which is illuminated only when material is flowing into the hopper, and de-energizes coil 96 to open contacts 96'. Thus flow of material is stopped, and the weighing system is again under control of start button 94, since solenoid 100 and coil 96 cannot be energized until the start button is again closed.

A hopper discharge valve 106 (Fig. 1) is provided to drain material from the hopper. It is essential that the hopper discharge valve be closed before a weighing system operation is started. To this end a solenoid 108 (Fig. 2) which in energized condition, opens valve 106, is connected in series with switch 110 and connected in parallel with relay coil 112 between power leads 82 and 84. Normally closed contacts 90 are controlled by coil 112 and are opened when coil 112 is energized. When switch 110 is closed, valve 106 is opened to empty the hopper, and the weighing system is rendered inoperative by the opening of contacts 90, so that the weighing cycle then cannot be initiated, and hence material will not enter the hopper and pass through the discharge valve without being weighed. Thus with contacts 90 opened by the energization of coil 112, the start button 94 cannot initiate a weighing cycle. It is also necessary to prevent operation of the weighing system until the amplifier has sufficiently warmed up, since the failure of the amplifier to accurately amplify the error signal would produce an erroneous cut-off of material flow. To this end a time delay circuit 114 of any conventional type is associated with contacts 92 such that these contacts will remain open for a predetermined length of time after control switch 88 is closed, the predetermined length of time being of a sufficient period to insure that amplifier 24 becomes thoroughly warmed up. Hence during amplifier warm up, contacts 92 are open to render control circuit 30 and particularly push button 94 ineffective, but after amplifier warm up is completed, the contacts 92 close and the control circuit is operative.

As previously mentioned phase detector relay 26 serves to hold relay contacts 80 in a closed condition when the opposing voltage of the cut-off circuit exceeds the load cell voltage, and opens contacts 80 when the net load cell voltage and cut-off circuit voltage are equal. It will be noted in Fig. 2 that the output circuit of amplifier 24, as indicated by transformer winding 120, is connected between the grid and cathode of a pair of electronic tubes 122 and 124 of the phase detector relay 26. The plates of tubes 122 and 124 are connected to the opposite ends of a transformer winding 126, the center tap of which is connected to ground as indicated at 128. The cathode of tube 124 is connected to ground through a condenser 130, while the cathode of tube 122 is connected to ground through a similar condenser 132. A first relay winding 134, potentiometer 136 and second relay winding 138 are connected in series between the cathode of these tubes. The movable contact 140 of potentiometer 136 is connected to ground as indicated, and serves as a simple adjustment to balance the tubes. With this arrangement the voltage between the plate of tube 124 and ground will be 180 electrical degrees out of phase with the voltage between the plate of tube 122 and ground, since transformer winding 126 is center tapped as shown. Thus with an A.-C. error signal from amplifier 24 supplied between ground and the grids of tubes 122 and 124, that tube having its plate voltage more nearly in phase with the amplifier output signal will conduct to the greater extent, while the other tube having its plate voltage more out of phase with the amplifier output signal, will not conduct plate current to any appreciable extent. As previously indicated, the net load cell voltage and cut-off circuit voltage are in phase opposition. Therefore, when the cut-off circuit voltage exceeds the load cell voltage, the amplified error signal will be of one phase. On the other hand if the load cell voltage should exceed the cut-off circuit voltage, the amplified signal at the output of the amplifier will be of the opposite phase.

For purposes of explanation only, it will be assumed that the plate voltage on tube 124 is in phase with the error signal present in the amplifier output when the cut-off circuit voltage exceeds the net load cell voltage. Thus tube 124 will conduct current from the ground connection indicated at 142, through the left hand portion of potentiometer 136, relay winding 134 and the lower half of transformer winding 126 to ground at connection 128. At the same time the amplifier output voltage will be out of phase with the plate voltage of tube 122, and relay coil 138 will pass only a small current. When the amplifier voltage is of the opposite phase to indicate that the load cell voltage exceeds any opposing voltage, relay coil 138 passes a large current due to the large conductance of tube 122, while relay coil 134 carries only a small current. Both relay windings are equally energized when there is no error signal. While contacts 80 are arranged in control circuit 30, for the sake of clarity a mechanical arrangement of the movable and fixed members making up contacts 80 are schematically shown in Fig. 2 in operative association with coils 134 and 138. Thus it will be seen that contacts 80 close when coil 134 is energized to a greater extent than coil 138, the contacts open when coil 138 is more highly energized than coil 134, and the contacts open when the coils are equally energized. Hence contacts 80 are closed only when the cut-off circuit voltage exceeds the load cell voltage, so that closure of start button 94 initiates the flow of material to the scale; contacts 80 open to stop the flow of material to the hopper when the voltages balance indicating that the correct amount of material has been delivered to the scale; and contacts 80 are open when the load cell voltage is greater than the cut-off voltage to prevent delivery of any material to the scale under these conditions. Thus phase detector relay 26 is a polarized relay that closes contacts 80 when the error signal is of one phase and opens the contacts when the error signal is zero or of the other phase.

Balance measuring circuit 105 is essentially the same in function as balance detector 26 except that the relays are replaced by meter 104 and other voltage dropping elements. The plates of tubes 107 and 109 are connected to center-tapped transformer winding 128, while the error signal of amplifier 24 is supplied between the control grid and cathode of both tubes by transformer winding 111. In the place of the relay windings of phase detector relay 26, fixed resistors 113 and 115 are arranged in the plate circuits of tubes 107 and 109, respectively. Meter 104 is connected between the cathodes in series with a range resistor 117. Thus meter 104 measures the voltage drop across resistors 113 and 115 produced by plate current flow therethrough.

Assuming by way of example only, that the plate voltage of tube 107 is in phase with the error signal supplied to the grids when the cut-off circuit voltage exceeds the net load cell voltage, tube 107 will conduct current through resistor 113 when such an error signal is present. At the same time the error signal will be out of phase with the plate voltage of tube 109 and resistor 115 will conduct only a small plate current. When the error signal as supplied by transformer winding 111 is of the opposite phase to indicate that the load cell voltage exceeds any opposing voltage, resistor 115 passes a large current while only a small current flows through resistor 113. Both resistors 113 and 115 pass an equal current when the error signal is zero.

Hence the voltage drop across resistor 113 is greater than the voltage drop across resistor 115 when the load cell voltage is smaller in value than any opposing voltage, is less than the voltage drop across resistors 115 when the cut-off voltages inadvertently exceed the load cell voltage, and is equal to the voltage drop across resistor 115 when the voltages balance to produce zero error signal. The voltage drop across resistors 113 and 115 is 180° out of phase and meter 104 is connected to read the algebraic sum of the voltage drop. Hence the pointer of meter 104 will read zero at the center of its dial when the error signal is zero and will be deflected in one direction or the other depending upon whether the load cell voltage exceeds the opposing voltages or vice versa, the amount of deflection being proportional to the magnitude of the error signal. Thus meter 104 affords a visual indication of the state of voltage balance or unbalance in the series circuit comprising the load cell 12, balancing circuit 18 and cut-off circuit 20. As previously explained the dead or tare weights are compensated for by adjusting balancing circuit 18 to produce a zero reading on meter 104 when no load is in the hopper and cut-off circuit 20 is in its zero position of adjustment.

Fig. 3 shows an electrical diagram for the weighing system similar to Fig. 2 but further including apparatus providing a dribble approach to cut-off of material flow. Corresponding parts have been similarly numbered in Figs. 2 and 3, and Fig. 3 further includes a dribble circuit generally indicated at 158, a solenoid winding 160 controlling a conventional electro-magnetic flow valve of the dribble type (not shown in the drawings) and additional relay provisions in control circuit 30. Dribble circuit 158 is connected in series with cut-off circuit 20, balancing circuit 18, load cell network 12, and amplifier input 22. Current flow through a potentiometer 161 is produced by transformer 16 via secondary winding 162, the magnitude of the current flow being controlled by variable resistor 164. While dribble circuit 158 may be connected at any point in the series voltage balancing circuit, in Fig. 3 movable contact 46 of potentiometer 42 in balance circuit 18 is shown connected to one side of potentiometer 161, while movable contact 166 of the last mentioned potentiometer is connected to terminal 54 of cut-off circuit 20. Secondary winding 162 is so connected to potentiometer 161 that the current flow through this potentiometer produces a voltage drop thereacross that is in phase with the net load cell voltage, or in particular, the voltage drop across potentiometer 161 between the upper end thereof and movable contact 166 is in phase with net load cell voltage. The amount of voltage developed between the upper end of potentiometer 161 and movable contact 166 will be hereinafter referred to as the dribble voltage. By moving contact 166 downwardly in Fig. 3, the dribble voltage is increased, while moving contact 166 upwardly decreases the dribble voltage. In parallel with potentiometer 161 are relay contacts 168, which when closed place contacts 46 and 166 at the same potential, thereby rendering the dribble voltage ineffective. Closure of contacts 168 is effected by control circuit 30 in the manner now to be described.

Referring to the control circuit portion of Fig. 3, normally closed stop button 102 and normally open start button 94 are connected in series between voltage supply main 82 and a conductor 170 extending across the upper end of control circuit 30. Relay coils 172 and 174 are connected between conductor 170 and supply line 84. Contacts 172′ of coil 172 are connected in series with normally closed relay contacts 174′ of relay coil 174, and this series connection parallels start button 94. Since contacts 174′ are normally closed, momentarily pressing start button 94 energizes coil 172 to close contacts 172′ and complete a holding circuit for coil 172 through contacts 172′ and 174′. This connects lead 82 to conductor 170. As presently described in the weighing system of Fig. 3, three pairs of contacts 80′, 80″, and 80‴ are controlled by phase detector relay 26. Contacts 80′ are connected in series with relay coil 176 and are paralleled by contacts 176′ of coil 176, while contacts 80″ are connected in series with contacts 176″ and relay coil 178, with both contacts 80″ and 176″ being paralleled by contacts 178′. The contacts 80‴ of phase detector relay 26 are connected in series with contacts 178" and coil 174. Thus contacts 80', 80" and 80'" alone or in conjunction with other relay contacts, control the energization of relay coils 174, 176 and 178 by completing a circuit therethrough between conductor 170 and supply lead 84. The solenoid 100 of the main material supply valve is connected in series with normally closed relay contacts 176'", while solenoid 160 of the dribble valve parallels the main valve solenoid and contacts 176'" between conductors 170 and 84. The previously mentioned contacts 168 paralleling potentiometer 161 in the dribble circuit 158, are controlled by coil 176, the contacts 168 being closed when relay coil 176 is energized.

In order to describe the operation of the weighing system shown in Fig. 3, it will be assumed by way of example that 900 pounds of material are to be delivered into a hopper supported by load cell network 12, and that 875 pounds of the material are to be delivered at a high rate of speed while the last 25 pounds are to be delivered to the hopper at the dribble rate. After the balance circuit 18 has been adjusted to produce a zero reading on meter 104 with no material in the hopper, the movable contact 166 of the dribble circuit 158 is adjusted to a position producing a voltage drop equal to the amount of net load cell voltage produced by adding 25 pounds to the hopper. It should be appreciated that the movement of contact 166 relative to potentiometer 161 can be calibrated in terms of pounds to facilitate adjustment of the amount of material which will dribble into the hopper. In the manner previously described, movable contact 56 of cut-off circuit 20 is moved to a position representing 900 pounds, i.e., 900 pounds of equivalent voltage is produced in opposition to the dribble voltage. Thus the initial error signal in the series voltage balancing circuit is proportional to 875 pounds. The operation of the system is initiated by momentarily pressing start button 94. If the amplifier is sufficiently warmed and the hopper discharge valve is closed so that contacts 90 and 92 are closed, coil 172 is energized to close contacts 172' and supply voltage to conductor 170. Dribble solenoid 160 and main solenoid 100 of the material supply valves will be energized to start the flow of material to the hopper, the main solenoid being energized because contacts 176'" are in closed condition. While contacts 80', 80" and 80'" are arranged in control circuit 30 as shown, to facilitate a clear understanding of the operation of the phase detector relay a representative mechanical arrangement of contacts 80', 80" and 80'" is shown in operative association with coils 134 and 138 of phase detector relay 26. Phase detector relay 26 in Fig. 3 is the same as shown in Fig. 2 except that three pairs of contacts are required with the relay of Fig. 3. As described in connection with Fig. 2 coil 134 is energized to a greater extent than coil 138 when the cut-off circuit voltage exceeds the load cell voltage, to a lesser extent when the load cell voltage exceeds the cut-off circuit voltage, and to an equal extent when the error signal is zero. Thus it will appear from the mechanical arrangement of Fig. 3 that contacts 80' and 80'" of phase detector relay 26 are closed when a balance of voltage occurs in the series circuit and when the load cell voltage inadvertently exceeds the opposing voltages provided by cut-off circuit 20 and balancing circuit 18, while contacts 80" are open when a balance occurs or the load cell voltage inadvertently exceeds any opposing voltage. Contacts 80' and 80'" are opened and contacts 80" are closed when the opposing voltage of the cut-off circuit exceeds the load cell voltage. Thus coils 174 and 176 are de-energized because contacts 80' and 80'" are open, and relay coil 178 is de-energized because contacts 176" of relay coil 176 are open, even though contacts 80" are closed. As material continues to flow into the hopper through both the main and dribble valves, the error signal diminishes due to the increasing load cell voltage, the error voltage being equal to the algebraic sum of the load cell voltage, tare voltage, dribble voltage and opposing voltage of the cut-off circuit.

After 875 pounds of material has been delivered to the hopper, the error signal will have been reduced to zero so that the phase detector relay 26, sensing the absence of an error signal, will close contacts 80' and 80'" while at the same time opening contacts 80". Closing of contacts 80' energizes relay coil 176 which then remains energized via contacts 176' paralleling contacts 80'. Energization of coil 176 also opens the normally closed contacts 176'" to de-energize the main material supply solenoid 100 and stop the flow of material to the hopper through the main valve, while at the same time closing contacts 176". Since contacts 80" are opened due to a balanced condition in the series voltage balancing circuit, relay coil 178 will not be energized. Likewise, relay coil 174 is not energized by closure of contacts 80'" since relay contacts 178" remain open. Thus in the control part of the circuit, energization of coil 176 simply de-energizes main solenoid 100. At the same time contacts 168 in the dribble circuit 158 are closed by the energization of relay coil 176, and this closure of contacts 168 effectively short circuits potentiometer 161 so that the dribble voltage heretofore provided by the dribble circuit no longer is present in the series voltage balancing circuit. Removal of the dribble voltage from the series voltage circuit re-establishes an unbalanced condition of voltages. In particular with the example selected, immediately after contacts 168 are closed, the opposing voltage of the cut-off circuit as determined by its 900 pound setting bucks against a net load cell voltage representative of 875 pounds, so that an error signal proportional to 25 pounds exists. The presence of this error signal is sensed by phase detector relay 26 and causes relay contacts 80' and 80'" to open again, while at the same time closing contacts 80". Opening of contacts 80' has no effect, since coil 176 remains energized through its holding contacts 176', but closing contacts 80" energizes relay coil 178, since contacts 176" are closed, and coil 178 is retained in its energized condition by holding contacts 178' thereof. Energization of coil 178 also closes contacts 178" in series with relay coil 174, but this coil is not energized since contacts 80'" are opened due to the presence of an error signal in the series voltage balancing circuit. The control circuit 30 will remain in this condition until the material dribble valve has delivered the last 25 pounds of material to the hopper. When enough material dribbles into the hopper so that the net load cell voltage is proportional to 900 pounds, a condition of balanced voltages again prevails in the series voltage balancing circuit, i.e., the error signal is zero. The phase detector relay 26 sensing zero error voltage, causes closure of contacts 80' and 80'" while opening contacts 80". The respective closing and opening of contacts 80' and 80" serves no purpose at this point in the weighing cycle, since relay windings 176 and 178 are energized by their holding circuits. However, closure of contacts 80'" energizes relay coil 174, since contacts 178" in series therewith are closed. Normally closed contacts 174' of coil 174 are in series between voltage supply line 82 and conductor 170 in a path paralleling the normally open start button 94, and energization of coil 174 opens contacts 174' to remove the supply voltage from conductor 170 and thereby de-energize relay coils 172, 174, 176 and 178. At the same time the dribble solenoid 160 is de-energized to entirely stop the flow of material to the hopper, and main valve solenoid 100 is maintained in a de-energized condition to complete the weighing cycle.

In the weighing scale system shown in Fig. 3, as material is fed to the hopper a first condition of voltage balance occurs to indicate that the remainder of the material is to be delivered to the hopper at the dribble rate, and the control circuit automatically accomplishes this. The dribble voltage is rendered ineffective to produce an error signal and material dribbles into the hopper until another condition of balance occurs to indicate that the preselected weight of material is in the hopper, whereupon the control circuits automatically terminate the weighing cycle. The dribble voltage is of the same phase as the net load cell voltage and therefore is opposed to the cut-off circuit voltage. Hence in essence, when the dribble voltage is effective it increases the load cell voltage by an amount proportional to the weight of the material to be delivered at the dribble rate.

The weighing systems hereinbefore described are usually used to weigh one material but the batch weighing system of Fig. 4 now to be described, is used to weigh several ingredients which are mixed together in the hopper. In general, the batch weighing system utilizes the basic electrical apparatus of the other weighing systems, which apparatus includes a load cell network 12, tare and dead weight balancing circuit 18, cut-off circuit 20, dribble voltage circuit 158, amplifier 24, phase detector relay 26, flow control valve means and control circuits, and in Fig. 4 corresponding numbers are used to designate corresponding parts of the weighing systems. However, in the batch weighing system a plurality of flow control valve means and cut-off circuits are employed, one for each ingredient, and a sequentially operative control circuit is utilized. In particular, the batch weighing system of Fig. 4 is adapted to produce batches with as many as five ingredients, and therefore five cut-off circuits, five main material flow valves and five dribble valves are provided. As will hereinafter appear, a sequential switching arrangement in the control circuit of the batch weigher renders the cut-off circuit and flow control valve means for the ingredients effective one by one.

All five of the ingredients to be weighed by the batch weigher, are delivered into a single hopper (not shown) which is supported by a load cell, as in the manner shown by Fig. 1. The electrical network 12 of the load cell, tare and dead weight balancing circuit 18, dribble circuit 158 and amplifier input 22 are connected in series relationship as hereinbefore described. However, the dribble voltage developed across potentiometer 161 in dribble circuit 158, is rendered effective or ineffective in the series voltage balancing circuit by means of a rotary switch 190 having a movable switch blade 192 associated with a plurality of contacts. Switch blade 192 is connected by lead 194 to movable contact 46 of the balance circuit potentiometer 42, while movable contact 166 of potentiometer 161 in the dribble circuit 158 is connected by lead 196 to alternate contacts of switch 190. When switch blade 192 is in engagement with the contacts of switch 190 which are connected to the dribble circuit by lead 196, the dribble voltage is effectively shorted out through lead 194, switch blade 192 and lead 196. When switch blade 192 engages one of the contacts of switch 190 which is not connected to lead 196, the dribble voltage is effective in the series voltage balancing circuit. As will be hereinafter explained, as switch blade 192 moves counter-clockwise as viewed in Fig. 4, the dribble voltage will be alternately effective and ineffective in the voltage balancing circuit.

Since up to five ingredients are to be included in the batch, five cut-off circuits, designated by numbers 198, 200, 202, 204 and 206, are provided. The cut-off circuits are connected into the series voltage balancing circuit by a rotary switch assembly 208 having a movable switch blade 210 engageable with a plurality of contacts. The uppermost contact 211 of switch 208 is connected to balancing circuit 18, while the remainder of the contacts are connected in pairs to the cut-off circuits. The pairs of contacts designated by numbers 212, 214, 216, 218 and 220, are respectively connected to movable contacts 222, 224, 226, 228, 230 of the potentiometers in cut-off circuits 198, 200, 202, 204 and 206. Switch blade 210 of switch 208 is connected by lead 232 to the input transformer 22 of amplifier 24. Thus with blade 210 engaging contact 211, load cell network 12, tare balancing circuit 18 and amplifier input 22 are connected in series, while dribble circuit 158 and the several cut-off circuits are not connected in the series voltage balancing circuit. When blade 210 engages either one of the contacts of pair 212, both dribble circuit 158 and cut-off circuit 198 are included in the series balancing circuit with the load cell network 12 and tare balance circuit 18, but as will be explained, the effect of any dribble voltage may be nullified by switch 190. Likewise, when blade 210 moves into engagement with either contact of pairs 214, 216, 218, and 220, cut-off circuits 200, 202, 204 and 206 are connected into the voltage balancing circuit in that order, with all of the cut-off circuits connected in series with the load cell network 12, tare balance circuit 18, dribble circuit 158 and amplifier input 22 when blade 210 engages one of the last pair of contacts 220. In operation, the movable contacts 222, 224, 226, 228 and 230 are adjusted to positions respectively providing cut-off voltages representative of the desired weights of the first, second, third, fourth and fifth ingredient that will be present in the batch, and these cut-off voltages are rendered effective in the series voltage balancing circuit by switch 208 in this order.

As previously mentioned a separate main flow control valve and a separate dribble flow valve are supplied for each ingredient. The solenoids for operating the main flow control valves for the first, second, third, fourth and fifth ingredients that are added to a batch in that order, are indicated by numerals 234, 236, 238, 240 and 242, while the solenoids for operating the dribble valves for these ingredients are designated by numerals 244, 246, 248, 250 and 252. Energization of any particular solenoid opens the flow control valve operated thereby, and de-energization of the solenoid closes the valve. Current flow to the solenoids is controlled by a rotary switch 254 having a switch blade 256 and a plurality of contacts, one of the contacts being connected to one of the main or dribble solenoids. Blade 256 is connected to power supply lead 84, while the upper ends of the solenoids (Fig. 4) are connected to power supply lead 82 through certain contacts and controls to be presently described. As indicated in dotted lines, the rotary switch blades of switches 190, 208 and 254 are ganged together and are driven by a synchronous motor 258 in control circuit 30. Also driven by motor 258 is a cam member 260, which controls microswitch 262 having normally closed contacts 264 in the control circuit 30. Motor 258 is operative to step switch blades 192, 210 and 256 from one contact to the next of each switch and to open contacts 264 of switch 262 each time the switch blades are stepped from one contact to the next. While no suitable gearing is shown between cam 260 and switch blades 190, 210, and 256 it should be appreciated that cam 260 makes a complete revolution each time the switch blades move from one contact to the next.

In operation of the batch weighing system of Fig. 4, the weight of the first ingredient is selected by adjusting movable contact 222 to a position whereby cut-off circuit 198 produces an opposing voltage equal to the load cell voltage developed when the weight of material in the hopper equals the selected value. Likewise, movable contact 224 is adjusted to a position where an opposing voltage representative of the desired weight for the second ingredient is developed by cut-off circuit 200 between movable contacts 222 and 224. Similarly, cut-off circuits 202, 204 and 206 are adjusted for the third, fourth and fifth ingredients. In practice, the movable contacts may be mechanically connected to indicators, which are calibrated to read in pounds of material, so that a visual indication of the number of pounds of each ingredient is obtained. A typical indicator arrangement is shown on Fig. 4 for the first ingredient wherein an adjustable contact 222 is coupled over a mechanical linkage 400 of any suitable construction to an indicator pointer 401. The indicator pointer 401 is arranged to ride along the face of a chart 402 which is calibrated in weight units. Similar mechanical linkages and charts are provided (but not illustrated) for the other ingredients. The movable contact 166 of potentiometer 161 in dribble circuit 158 may then be adjusted to determine how many pounds of each ingredient is to be delivered to the load cell supported hopper at the slow, dribble rate. With the batch weighing system in its inoperative condition as shown in Fig. 4, the switch blades 192, 210 and 256 are in the "off" or zero position. Hence blade 210 engages contact 211 of switch 208 so that the movable contact 46 of tare balance circuit 18 is connected directly with the input of amplifier 24 via contact 211, blade 210 and lead 232. This connection effectively removes all cut-off circuits and the dribble circuit from the series voltage balancing circuit so that only the load cell network 12 and balance circuit 18 produce any input signal to the amplifier. If the balance circuit 18 is properly adjusted to compensate for any dead or tare weights, meter 104 reads zero, but if the meter does not so read, movable contact 46 in balance circuit 18 is adjusted until the load cell voltage produced by dead or tare weights is balanced out.

The weighing function of the batch weighing system is started by pushing start button 94, which energizes coil 172 to close contacts 172'. Closing start switch 94 connects power supply lead 82 to conductor 266 in control circuit 30. Contacts 80 of phase detector relay 26 are arranged in series with relay coil 268, which has contacts 268', 268" and 268'". Contacts 80 of phase detector relay 26 are a part of control circuit 30 but for clarity a mechanical arrangement of the contacts is enclosed by broken line 269 in association with the relay. The contacts are arranged to be closed when a balanced voltage condition exists as determined by the output of amplifier 24 which phase detector relay 26 senses, to be closed if the load cell voltage should be inadvertently exceed any opposing voltage, and to be opened when the load cell voltage is less than the opposing voltage of the cut-off circuit. Hence after any tare and dead weights are balanced, there is zero error signal and contacts 80 are closed to energize coil 268. Thus contacts 268' are closed to establish a holding circuit for coil 268 through normally closed contacts 264 of switch 262; contacts 268" are closed to supply current to windings 270 and 272 of motor 258; and contacts 268'" are opened to prevent energization of any of the valve control solenoids. Current flow through windings 270 and 272 rotates motor 258 and consequently moves switch blades 192, 210 and 256 from their zero contacts, designated on Fig. 4 by the symbol #0, to the #1 contacts. As blade 210 engages #1 contact of a pair of contacts 212, cut-off circuit 198 for the first ingredient is connected into the series voltage balancing circuit so an error signal equal to the opposing voltage supplied by cut-off circuit 198 is sensed by phase detector relay 26. The presence of this error signal causes contacts 80 to open. As motor 258 completes rotation to place the switch blades in engagement with the #1 contacts, cam 260 has rotated to a position opening contacts 264 of switch 262, which contacts are in series with contacts 268'. Since contacts 80 and 264 are both opened, coil 268 is de-energized to open contacts 268', open contacts 268" to stop motor 258 from further rotation, and close contacts 268'" which connect conductor 266 to lead 274 associated with the flow control valve solenoids. Since blade 256 of switch 254 engages contact #1, main flow control valve solenoid 234 is energized to start the flow of the first ingredient into the batch hopper (not shown). It is to be noted that with the rotary switches so disposed, dribble circuit 158 is effective in the series voltage balancing circuit.

The first ingredient will flow into the hopper until a second condition of balance prevails in the series voltage balancing circuit, i.e. zero error signal, which indicates that the remainder of the first ingredient is to be delivered at a dribble rate. When the error signal reaches zero value, phase detector relay 26 closes contacts 80 to energize coil 268. This closes contacts 268' to establish a holding circuit for coil 268 through contacts 268' and 264; closes contacts 268" to cause motor 258 to rotate the switch blades; and opens contacts 268'" to de-energize solenoid 234 and stop the flow of material to the hopper. Motor 258 drives switch blades 192, 210 and 256 into engagement with the #1' contacts, whereupon rotation of cam 260 opens contacts 264 of switch 262. When blade 192 of switch 190 engages contact #1', the dribble voltage produced by dribble circuit 158 is shorted out via lead 194, switch blade 192 and lead 196, and an unbalance of voltage again prevails. Thus contacts 80 are opened by phase detector relay 26 upon sensing this error signal, to de-energize coil 268, since contacts 264 are also open. As previously described de-energizing coil 268 opens contacts 268' to retain coil 268 de-energized; open contacts 268" to stop motor 258, and closes contacts 268'" to supply voltage to conductor 274. Since switch blade 256 engages contact #1', dribble valve solenoid 244 for the first ingredient is energized to dribble the remainder of the first material slowly into the hopper.

When the preselected quantity of the first ingredient is in the hopper, another condition of balanced voltages occurs and contacts 80 are closed to again energize coil 268. In turn contacts 268'" open to stop altogether the flow of the first material into the hopper, and contacts 268' and 268" close to cause the switch blades of switches 190, 208 and 254 to move into engagement with the #2 contacts. After contacts 264 of switch 262 open to de-energize relay coil 268 and motor 258, contacts 268'" close and energize main flow control valve solenoid 236 for the second ingredient. Since blade 210 engages #2 contact of the pair of contacts 214, the cut-off circuit 200 for the second ingredient is connected into series relationship with the dribble circuit 158, balance circuit 18, load cell network 12 and amplifier input 22. The dribble voltage is effective since blade 192 of switch 190 engages contacts #2 of the switch. Thus the second ingredient is delivered to the hopper until the dribble circuit 158 and load cell network 12 together produce a voltage that equals the opposing voltage of cut-off circuit 200. Cut-off circuit 198 is no longer effective to produce an error signal, since that part of the load cell voltage representative of the first ingredient in the hopper nullifies the opposing voltage of circuit 198. After all of the second ingredient that is to be delivered at a fast rate is in the hopper, the error signal reaches zero value and contacts 80 close to terminate the fast rate of feed for the second ingredient, and to start the dribble feed for the second ingredient in the same manner described in connection with the first ingredient.

After a balance of voltages has occured to terminate the dribble feed for the second ingredient, stepping switches 190, 208 and 254 are actuated to add in sequence the remaining ingredients, with each ingredient being first added at a fast rate and then at a dribble rate. As the fifth ingredient, the last ingredient in the batch weighing system shown in Fig. 4, is delivered into the hopper at the dribble rate, switch blades 192, 210 and 256 engage their #5' contacts. When a balanced voltage condition is reached to indicate that all of the fifth ingredient is in the hopper, motor 258 operates to return the switch blades 192, 210 and 256 to their zero positions in engagement with the #0 contacts. As blade 256 of switch 254 reaches the #0 position, coil 276 is energized from conductor 266 through blade 256. Coil 276 has normally closed contacts 276' connected in series with contacts 172', with this series arrangement shunting start button 94. Start button 94 is normally open during the operation of the batching system, so the line current of lead 82 is supplied to conductor 266 through series contacts 276' and 172'. Thus when coil 276 is energized to open contacts 276', lead 82 will be disconnected from conductor 266 to de-energize the control circuit 30. Since coil 172 is thereby de-energized to open contacts 172' this retains the control circuit 30 inoperative. Hence the batch weighing system automatically terminates the weighing cycle, and after the hopper is emptied, another cycle can be started only by operating start button 94. When the start button is pressed to start a weighing operation after the system is balanced for any tare or dead weights, relay coil 276 is momentarily energized to open contacts 276'. However, since there is no error signal, motor 258 immediately operates and moves switch blade 256 into engagement with #1 contact, so that coil 276 is de-energized to close contacts 276' and establish a holding circuit around start button 94 through contacts 276' and 172'. Thus releasing the start button 94 will not stop the weighing operation, but the weighing operation can be terminated by pushing stop button 102.

If all five ingredients are not to be included in a particular batch, the batch weighing system of Fig. 4 is adapted to by-pass one or more of the ingredients. For example, assume that none of the third ingredient is to be present in the final mixture. After the first and second ingredients are delivered to the hopper, switch blades 192, 210 and 256 move into engagement with their #3 contacts. As previously described, phase detector relay 26 opens contacts 80 whenever the opposing voltage provided by one or more cut-off circuits is greater than the combined net load cell voltage and dribble voltage, and under these conditions the error signal is of one particular phase. However, whenever the error signal is zero or is of the opposite phase to indicate that the net load cell voltage and dribble voltage is equal to or greater than any cut-off voltage, phase detector relay 26 senses this and closes contacts 80. Thus when the blades of switches 190, 210 and 256 engage the #3 contacts, the gross load cell voltage is balanced out by balancing circuit 18 and cut-off circuits 198 and 200. Due to its zero adjustment cut-off circuit 202 produces no cut-off voltage, so that the only error signal results from the dribble voltage of dribble circuit 158. This error signal actuates phase detector relay 26 to close contacts 80. Upon closure of contacts 80 the control circuit 30 enables motor 258 to operate and step the switch blades 192, 210 and 256 into engagement with the #3' contacts. In this position blade 192 of switch 190 shorts out the dribble voltage of dribble circuit 158 so that a balance of voltages, producing zero error signal, prevails in the voltage balancing circuit. Once again phase detector relay 26, sensing the zero error signal condition, closes contacts 80 to cause motor 258 to operate and move the switch blades into engagement with the #4 contacts, so that the batch weighing system is now in condition to deliver any preselected quantity of the fourth ingredient into the batch. While the manner in which the batch weigher by-passes an ingredient that is not to be present in the particular batch has been described in a step by step manner, it should be appreciated that the by-passing operation is very rapid. This operation is sufficiently rapid so that as a practical matter, the number 3 main and dribble valves do not open.

In the foregoing description of the operation of the batch weigher of Fig. 4, it has been assumed that a certain quantity of the ingredients was delivered to the hopper at a dribble rate. It should be understood that this dribble feed, while generally desirable, is not necessary. In other words, if an operator wishes to deliver each ingredient into the hopper at a rapid rate as controlled by the main flow control valve, the movable contact 166 of potentiometer 161 in dribble circuit 158 is adjusted to a position where zero dribble voltage is supplied by potentiometer 161. After control circuit 30 sets the weighing cycle in operation, main flow control valve solenoid 234 is energized to feed the first ingredient into a hopper (assuming the first ingredient is to be present in the final batch). When the predetermined quantity of the first ingredient, as determined by the setting of cut-off circuit 198, is supported by the load cell in the hopper, a voltage balance occurs in the series voltage balancing circuit to close contacts 80 via phase detector relay 26. Thus motor 258 is operated to move the rotary switch blades 192, 210 and 256 into engagement with their #1' contacts. Since dribble circuit 158 provides zero dribble voltage, shorting out the dribble potentiometer 161 does not produce an unbalanced condition, so the error signal remains at zero value. Hence contacts 80 are again closed by phase detector relay 26, when the rotary switch blades reach their #1' contacts, to energize motor 258 and immediately step the rotary switch blades into positions of engagement with their #2 contacts so that the dribble feed of the first ingredient is by-passed. In the same manner the weighing system by-passes a dribble feed of the other ingredients when the dribble voltage is of zero value.

In Fig. 4 synchronous motor 258 moves switch blades 192, 210 and 256 from one contact to the next of switches 190, 208 and 254 respectively, each time the motor is operated. It will be obvious that various other electro-mechanical devices such as a stepping relay, may be used in place of the synchronous motor to effect the sequential operation of the batch weighing system, and that certain changes in the circuitry of the weighing system may be effected without departing from the scope of this invention.

Among the several important features of this invention is the provision of an electrical circuit for protecting the weighing system against overloads. In batch weighing systems, for maximum flexibility in its weighing function, the maximum setting of the cut-off circuit of each ingredient should nearly equal the total capacity of the weighing system. For example, if the load cell of the weighing system shown in Fig. 4 has a maximum capacity of 10,000 lbs., it is desirable that the cut-off circuits for each ingredient be capable of adjustment to a position such that nearly 10,000 pounds of any one such ingredient could be delivered to the hopper. Thus if two or more of the cut-off circuits are so adjusted that the total material delivered into the hopper would exceed 10,000 lbs., the load cell would be over stressed. An overload protection circuit 278, to prevent overstressing of and damage to the load cell, is shown in the lower left hand corner of Fig. 4, this circuit including a bridge circuit portion 280 and an electronic device such as a thyratron or gas filled tube 282. Bridge circuit 280 is energized from secondary winding 284 of transformer 16. One leg of bridge circuit 280 is formed of fixed resistor 286 and rheostat 288, with the output terminal 290 intermediate thereof connected to the cathode of tube 282. The other leg of bridge 280 is formed of a fixed resistor 292 and a plurality of potentiometers 294, 296, 298, 300 and 302, and the other output terminal 304 is connected to the control grid of tube 282. Thus any potential which appears between output terminals 290 and 304 will be impressed between the cathode and control grid of tube 282. The movable contacts 308, 310, 312, 314 and 316 of the potentiometers are mechanically connected (ganged) for movement respectively, with the movable contacts 222, 224, 226, 228 and 230 of the cut-off circuits 198, 200, 202, 204 and 206. Assume by way of example that during the half cycle when the plate voltage of tube 282 is positive with respect to the cathode, the tube will conduct appreciable plate current when its control grid is two volts negative with respect to the cathode, and plate circuit conduction will be cut off at higher negative grid potentials. The movable contacts 308, 310, 312, 314 and 316 are so mechanically connected to the cut-off circuits, and the resistance values are so selected for resistors 286 and 292, variable resistor 288 and potentiometers 294, 296, 298, 300 and 302, such that a relatively large control voltage, such as 50 volts will be developed between output terminals 290 and 304 when movable contacts 222, 224, 226, 228 and 230 are all in their zero positions. The phasing of this control potential is such that terminal 304, and therefore the control grid of tube 282, is negative relative to the cathode during the half cycle that the plate is positive with respect to the cathode. Thus no conduction occurs through tube 282, because of the negative biasing effect of the control potential.

Plate supply voltage for tube 282 is obtained from power leads 82 and 84, since the plate and cathode are respectively connected to these leads. A relay coil 318, paralleled by capacitor 320, is connected to pass the plate current of tube 282. Thus when cut-off circuits 198, 200, 202, 204 and 206 are adjusted to their zero positions, relay coil 318 is de-energized because no plate current flows in tube 282 due to the negative biasing effect of bridge circuit 280. Coil 318 controls normally closed contacts 318', which are in control circuit 30, connected between supply lead 82 and conductor 266. Hence with contacts 318' closed, pushing start button 94 will initiate the weighing cycle. However, if movable contacts 222, 224, 226, 228 and 230 are adjusted to positions representing a greater total weight for the batch than the load cell capacity, movable contacts 308, 310, 312, 314 and 316 will be positioned so that the output voltage of bridge 280 is reduced, i.e. made less negative. Thus when the total weight as represented by the cut-off circuit settings, exceeds the load cell capacity, bridge 280 supplies a bias voltage to tube 282 of −2 volts or even a lesser negative bias, so that ample plate current flows through relay coil 318 to open contacts 318'. Hence the control circuit is inoperative, and until the batch formula is changed by readjusting the cut-off circuits, the batch weigher cannot operate. It will be noted that if at any time, either during a weighing cycle or before a weighing operation is started, the cut-off circuits are so adjusted that the total batch weight would exceed load cell capacity, the weighing cycle will terminate and/or cannot be started until the cut-off circuits are readjusted.

It will be appreciated that the weighing systems of the present invention once they are set in operation automatically deliver exactly a predetermined quantity of material into a hopper, the predetermined quantity being selected by adjusting the value of a cut-off voltage. Any tare or dead weight associated with the hopper is compensated for by a balancing circuit so only the net load cell voltage, which is proportional to the material in the hopper, opposes the cut-off voltage. Novel circuit parts of our system cooperate to produce automatically a dribble approach to cut-off material delivery to the hopper. The amount of material that is delivered to the hopper at the slower dribble rate may be readily changed by simply increasing or decreasing the amount of dribble voltage. Furthermore the batch weigher of the present invention automatically measures several ingredients into a hopper in exact accordance with the "batch formula" as set up on the cut-off circuits for the several ingredients. Importantly only a single dribble circuit is required to provide a dribble approach to cut-off material flow for all the ingredients; the control circuits automatically operate the batch weigher in a fool proof manner; the batch weigher is guarded against overload damage by a novel safety control circuit; and one or any number of the ingredients may be by-passed when the ingredient is not to be present in the final batch. Having now described in detail the present invention it will be apparent that certain changes, substitutes or modifications can be practiced in the invention without departing from the scope of the appended claims.

We claim:

1. In a weighing system, means for receiving material to be weighed, means for delivering material to said receiving means, means for producing a first voltage proportional to the weight of the material carried by said receiving means, means for producing a second voltage which is proportional to the value of said first voltage produced by a predetermined quantity of material carried by said receiving means, means for producing a third voltage which is proportional to the value of said first voltage produced by a fractional part of said predetermined quantity of material carried by said receiving means, circuit means for combining said voltages to produce a resultant voltage, means for sensing said resultant voltage and operating said material delivery means to control the rate of material delivery to said material receiving means.

2. In a weighing system, means for receiving material to be weighed, means for delivering material to said receiving means, means for producing a first voltage proportional to the weight of the material received by said receiving means, means for producing a second voltage proportional to the value of said first voltage produced by a predetermined quantity of material on said receiving means, means for producing a third voltage proportional to the value of said first voltage produced by a fractional part of said predetermined quantity of material on said receiving means, circuit means for combining said voltages to produce a first resultant voltage, means for sensing the value of said first resultant voltage means controlled by said sensing means and operative to control the rate of material delivery to said receiving means by said material delivery means when said predetermined quantity of material less said fractional part of said predetermined quantity of material is received by said receiving means, means rendering said third voltage ineffective in said voltage combining circuit means, thereby causing said circuit means to produce a second resultant voltage, said sensing means being arranged to sense the value of said second resultant voltage, and means controlled by said sensing means and operative to stop the delivery of material to said receiving means when said predetermined quantity of material is received by said receiving means.

3. In a weighing system, a hopper for receiving material to be weighed, means controlling the delivery of material to said hopper, a load cell supporting said hopper and producing a gross voltage proportional to the weight of material in said hopper and dead weight of said hopper carried by said load cell, a balancing circuit producing a first voltage in opposition to said gross voltage and equal in value to that part of said gross voltage representative of said dead weight, cut-off circuit producing a second voltage in opposition to said gross voltage, said second voltage being of a preselected constant value and being proportional to that part of said gross voltage produced by a predetermined weight of material desired to be deposited on said hopper only, and a control circuit for the weighing system including a detector circuit to sense the difference voltage between said gross voltage and said first and second voltages and actuate said material delivery means to stop the flow of material to said hopper when said difference voltage reaches a certain value.

4. In a weighing system, a hopper for receiving material to be weighed, first valve means for delivering material at a given rate to said hopper, second valve means for delivering material at a different rate to said hopper, a load cell associated with said hopper and producing a first voltage proportional to the weight of the material in said hopper, a cut-off circuit producing a second voltage in phase opposition to said first voltage and having a value proportional to the value of said first voltage produced by a predetermined weight of material in said hopper, means producing a third voltage in phase with said first voltage and proportional to the value of said first voltage produced by a certain fraction of said predetermined weight of material in said hopper, circuit means combining said voltages to produce a first resultant voltage, means to render said third voltage ineffective in said voltage combining circuit means, resulting in a second resultant voltage, means to actuate said first valve means to terminate the delivery of material to said hopper at said given rate when said first resultant voltage attains zero value, and means to actuate said second valve means to stop delivery of material to said receiving means when said second resultant voltage attains zero value.

5. In a batch weighing system, means for receiving ingredients to be weighed, means delivering a plurality of ingredients to said receiving means, first circuit means producing a first voltage representative of a predetermined weight of a first ingredient, second circuit means producing a second voltage representative of a predetermined weight of a second ingredient, third circuit means producing a third voltage proportional to the weight of ingredients disposed on said received means, and a control circuit for sensing the values of said voltages and operating said ingredient delivery means to stop delivery of said first and second ingredients after said predetermined weights of said first and second ingredients are on said receiving means.

6. In a batch weighing system for measuring into a hopper a plurality of ingredients, a first cut-off circuit producing a first control voltage proportional to a predetermined weight of a first ingredient, a second cut-off circuit producing a second control voltage proportional to a predetermined weight of a second ingredient, first valve means controlling the flow of the first ingredient to said hopper, second valve means controlling the flow of the second ingredient to said hopper, a load cell producing a third voltage proportional to the weight of the ingredients in said hopper, and a control circuit including means to render said first cut-off circuit effective, relay means sensing the values of said third voltage and first control voltage to actuate said first valve means and stop the flow of said first ingredient to said hopper when said predetermined weight of said first ingredient is in said hopper, and means to render said second cut-off circuit effective, said relay means sensing the value of said third voltage and second control voltage to actuate said second valve means and stop the flow of said second ingredient to said hopper when said predetermined weight of said second ingredient is in said hopper.

7. In a batch weighing system for measuring into a hopper a plurality of ingredients, a first cut-off circuit producing a first control voltage proportional to a predetermined weight of a first ingredient, a second cut-off circuit producing a second control voltage proportional to a predetermined weight of a second ingredient, first valve means controlling the flow of the first ingredient to said hopper, second valve means controlling the flow of the second ingredient to said hopper, a load cell producing a third voltage proportional to the weight of the ingredients in said hopper, switch means, driver means for operating said switch means initially to connect said third voltage into opposition with said first voltage and produce a first error signal and secondly to connect said third voltage into opposition with said second voltage and produce a second error signal, and means controlled by said error signals and operating said first and second valve means to stop the flow of said ingredients into the hopper after said predetermined weights of said ingredients are in the hopper.

8. In a batch weighing system for measuring into a hopper a plurality of ingredients, a first cut-off circuit producing a first control voltage proportional to a predetermined weight of a first ingredient, a second cut-off circuit producing a second control voltage proportional to a predetermined weight of a second ingredient, first valve means controlling the flow of the first ingredient to said hopper, second valve means controlling the flow of the second ingredient to said hopper, a load cell producing a third voltage proportional to the weight of the ingredients in said hopper, a stepping switch member having a first position connecting said third voltage and first control voltage in phase opposition to produce a first error signal and a second position connecting said third voltage in opposition to both said first and second control voltages to produce a second error signal, a phase detector relay adapted to sense the value of said first error signal and cut-off the flow of said first ingredient to said hopper and sense the value of said second error signal and cut-off the flow of said second ingredient to said hopper when said first and second ingredients in said hopper reach their respective predetermined weights, and a control circuit operated by said relay to move said stepping switch member from said first to said second position when said predetermined weight of said first ingredient is in said hopper.

9. In a batch weigher, a hopper for receiving the several ingredients of a batch, a load cell producing a voltage proportional to the weight of the ingredients in said hopper, a plurality of cut-off circuits each producing a control voltage proportional to a predetermined weight of an ingredient, a valve for controlling the delivery of each ingredient to said hopper, first stepping switch means to operate said valves and deliver ingredients in sequence to said hopper, second stepping switch means to oppose sequentially said control voltages to said load cell voltage, electromagnetic means for operating said stepping switches, a relay detector circuit for sensing the values of said opposed load cell and control voltages, and a control circuit to energize said electromagnetic means and operate said stepping switches after the predetermined weight of each ingredient is in said hopper.

10. In a batch weigher, a hopper for receiving the several ingredients of a batch, a load cell producing a voltage proportional to the weight of the ingredients in said hopper, a plurality of cut-off circuits each producing a control voltage proportional to a predetermined weight of an ingredient, main valve means operative to deliver each ingredient at a certain rate to said hopper, dribble valve means operative to deliver each ingredient at a lesser rate to said hopper, a voltage circuit producing a dribble voltage, a voltage balancing circuit producing an error signal, a first stepping switch operable to connect sequentially the control voltages of said cut-off circuits into said voltage balancing circuit, a second stepping switch operable alternately to connect and disconnect said dribble voltage into said voltage balancing circuit, a third stepping switch operable alternately to render said main valve means and dribble valve means operative, and means to actuate said stepping switches in response to the value of said error signal.

11. In a batch weigher, a hopper for receiving the ingredients of a batch, a load cell supporting said hopper, said load cell producing a voltage proportional to the weight of said hopper carried by said load cell and the weight of the ingredients in said hopper, a plurality of cut-off circuits each producing a control voltage proportional to a predetermined weight of an ingredient, valve means for controlling the delivery of each ingredient to said hopper, an electrical network producing a bucking voltage equal to that part of said load cell voltage due to the weight of said hopper carried by said load cell, circuit means for opposing said bucking voltage to said load cell voltage and thereby produce a net voltage proportional to the weight of the ingredients in said hopper, a voltage balancing ciruit including said load cell and electrical network and switching means sequentially to connect said cut-off circuits into said voltage balancing circuit.

12. In a batch weigher having a plurality of members each adjustable to positions representing the weight of a particular ingredient in the final batch of material, a control circuit for the batch weigher, electrical means in said control circuit operable to render said batch weigher inoperative, and an overload protection device including a voltage producing circuit having a reheostat ganged to each of said adjustable members and adapted to produce a control voltage representative of the positionment of said adjustable members, and means to sense the value of said control voltage and operate said electrical means when said control voltage reaches a predetermined value.

13. In a batch weighing system, adjustable rheostats each positioned according to the weight of an ingredient to be delivered to the system, a voltage circuit including said rheostats and producing a control voltage proportional to the total weight of the ingredients to be delivered to the system, electric tube means having said control voltage impressed thereon, relay means operated by said tube means to render said weighing system inoperative when said control voltage exceeds a predetermined value, said control voltage exceeding said predetermined value when the total weight of the ingredients exceeds the capacity of the weighing system.

References Cited in the file of this patent

UNITED STATES PATENTS

| Number | Name | Date |
|---|---|---|
| 2,208,284 | Weckerly | July 16, 1940 |
| 2,336,130 | Saxe | Dec. 7, 1943 |
| 2,412,506 | Greene et al. | Dec. 10, 1946 |
| 2,431,058 | Manning | Nov. 18, 1947 |
| 2,581,204 | Reilly | Jan. 1, 1952 |
| 2,581,205 | Reilly | Jan. 1, 1952 |
| 2,590,946 | Darling | Apr. 1, 1952 |
| 2,610,052 | Macgeorge | Sept. 9, 1952 |
| 2,650,057 | Goland et al. | Aug. 25, 1953 |
| 2,656,142 | Weckerly | Oct. 20, 1953 |
| 2,679,374 | Mylting | May 25, 1954 |
| 2,693,336 | Johnson et al. | Nov. 2, 1954 |
| 2,844,350 | Higham et al. | July 22, 1958 |
| 2,880,985 | Roberts | Apr. 7, 1959 |